Patented Nov. 6, 1928.

1,690,782

UNITED STATES PATENT OFFICE.

WINFRIED HENTRICH AND MAX HARDTMANN, OF WIESDORF, NEAR COLOGNE-ON-THE-RHINE, GERMANY, ASSIGNORS TO GRASSELLI DYESTUFF CORPORATION, OF NEW YORK, N. Y., A CORPORATION OF DELAWARE.

COMPLEX COPPER-AMMINE AZO DYESTUFFS.

No Drawing. Application filed December 9, 1926. Serial No. 153,723, and in Germany December 12, 1925.

The present invention relates to new copper-containing azo dyestuffs and to a process of preparing the same. More particularly, it relates to compounds of the general formula:

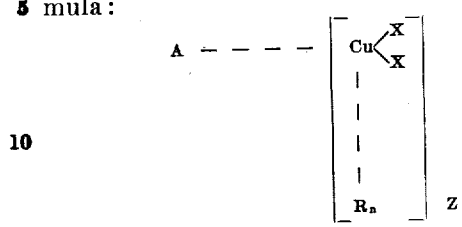

wherein A represents an azo dyestuff molecule containing in ortho-position to the azo group a substituent of the group including the hydroxyl-, the carboxyl-, and the carbonyl groups, X represents hydroxyl or an acidic radicle such as Cl, $CH_3COO$, etc., R represents molecules of the ammonia type or of the aquo ($H_2O$) type, but at least one R being a molecule of the ammonia type, $n$ represents the number 3 or 5 and Z represents the number 1 or 2.

Our preferred process for producing our new compounds consists in effecting the manufacture of the azo dyestuffs in question,—which may consist, for instance, in diazotizing an aromatic amine containing a hydroxyl-, carboxyl-, or a carbonyl group in ortho-position to the diazo compound, and coupling the diazo compound thus obtained with any desired coupling component, in the presence of a complex copper-ammine compound of the general formula:

wherein X and R represent the same as above and $n$ represents the number 4 or 6, and in the presence of a weakly alkaline neutralizing agent, such as sodium carbonate or aqueous ammonia.

However, in certain instances, it is also possible to produce our new compounds by causing a water-soluble copper-ammine compound to react with the finished azo dyestuff.

The chemical constitution of our new complex dyestuffs is not perfectly known. From their mode of formation and their chemical behavior the above given formula seems to be the best possible one. We wish it to be understood that the expression "molecules of the ammonia type", as used in the specification, includes ammonia as well as methylamine, ethyl-enediamine, pyridine, glycocoll, etc.

The copper-ammine compounds which we have found useful and tried out in our novel process can be exemplified by the following:

(1) Cupri-amines: tetramine-cupri sulfate $$[Cu(NH_3)_4]SO_4;$$

tetramine-cupri hydroxyd:

$$[Cu(NH_3)_4](OH)_2;$$

hexamine-cupri chloride:

$$[Cu(NH_3)_6]Cl_2;$$

triethylenediamine-cupri sulfate:

$$[Cu(H_2N-CH_2-CH_2-NH_2)_3]SO_4;$$

triethylenediamine-cupri chloride:

$$[Cu(N_2H-CH_2-CH_2-NH_2)_3]Cl_2$$

in both of which latter formulas the ethylenediamine molecule, often represented herein by the symbol "en", acts like two ammonia type molecules; hexa pyridine-cupri-bromide: $[Cu(C_5H_5N)_6]Br_2$; tetra pyridine cupri-acetate:

$$[Cu(C_5H_5N)_4](CH_3COO)_2;$$

tetra quinoline cupri chloride:

$$[Cu(C_9H_7N)_4]Cl_2;$$

tetra trimethylamine cupri sulfate:

$$[Cu(N(CH_3)_3)_4]SO_4;$$

tetra monomethylamine cupri sulfate:

$$[Cu(NH_2CH_3)_4]SO_4;$$

the glycocoll compound of the formula

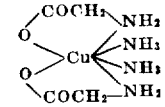

diethylenediamine-di-aquo-cupri chloride:

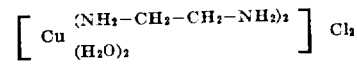

The applicability of our invention in novel copper-ammine-azo dyestuffs is an exceedingly wide one and permits of numerous variations also in the choice of the azo dyestuff components as well as in the procedure of promoting the reaction between these components and the copper-ammine complex compound.

In the case of tetrazo compounds, substituted in ortho position to both diazo groups by hydroxyl, carboxyl or carbonyl groups, the disazo dyestuffs produced from them react usually with two molecular proportions of a copper-ammine compound.

Our novel complex-copper-ammine-azo dyestuffs are obtained by our process directly in substantially pure form and can be used as such for dyeing purposes. They are, when made from sulfonated intermediates, usually water soluble, and due to the possibility of applying our novel reaction to a very large range of azo dyestuff components practically all possible shades and dyeing properties are obtainable and the dyestuffs are liable to be used for all kinds of dyeing purposes.

It goes without saying that this novel class of complex copper-ammine-azo dyestuffs comprises also such dyestuffs which contain a free amino group. These, when applied for instance to the fibre, can be further diazotized and coupled with any desired coupling compound.

Similarly it is also possible to diazotize on the fibre suitable azo dyestuffs containing no copper, but one or more diazotizable amino groups and to couple same with suitable coupling compounds in the presence of a copper-ammine complex, or particularly with such coupling compounds which, themselves, are capable of forming complex copper-ammine-azo compounds.

In cases where the novel copper-ammine-azo dyestuffs contain in ortho position to a hydroxyl group, a hydrogen atom capable of reacting with a diazo compound, dyeings of such dyestuffs can also be developed on the fibre with the usual developing diazo compounds, such as for instance p-nitro-diazo-benzene, etc.

By the usual methods for splitting up azo dyestuffs by reduction, our novel products yield a cuprous salt, a nitrogen base of the ammonia type, usually in form of a salt, the original aromatic amine and an amino derivative of the coupling compound.

The following examples will further illustrate our invention, the parts being by weight.

*Example 1.*—An aqueous solution of 166 parts 2-naphtholate of sodium containing 650 parts soda ash is added to an aqueous solution of tetrammine-cupri sulfate prepared by the action of about 555 parts 20% ammonia upon 300 parts crystallized copper sulfate in a little water. The diazo compound obtained in the usual manner from 177 parts 4-6-dichloro-amino-1-hydroxy-benzene is run into this solution. The novel cupro-ammine-azo dyestuff separates quickly as a water insoluble dark powder. It is easily soluble in alcohol with a bluish-red color and in concentrated sulfuric acid with a reddish-violet color. Reduction with tin chloride and hydrochloric acids breaks it up into 4-6-dichloro-2-amino-1-hydroxy-benzene, 1-amino-2-hydroxy-naphthalene, and cuprous chloride and ammonium-chloride. The dyestuff has most probably the formula:

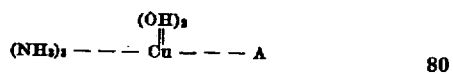

wherein A stands for the azo dyestuff of the formula:

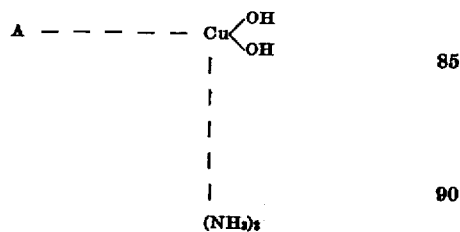

Substitution in the above example of the tetrammine-cupri sulfate by tetramonomethyl-ammine-cupri sulfate: $Cu(NH_2CH_3)_4SO_4$ produces a dyestuff having similar properties and of the probable formula:

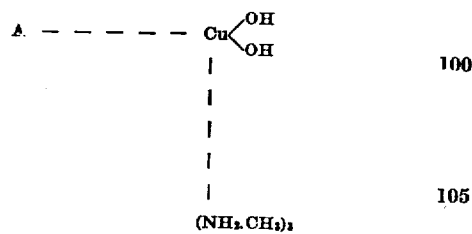

wherein A stands for the same azo dyestuff as above.

*Example 2.*—210 parts crystallized copper sulfate are dissolved in water and to the cold solution about 400 parts 20% aqueous ammonia added, a dark blue solution of tetrammine-cupri sulfate is so obtained. This solution is then added to an aqueous solution of 2-naphtholate of sodium obtained from 144 parts 2-naphthol and the requisite amount of caustic soda. 700 parts soda ash are then added and the so obtained clear bluish solution, which contains no trace of insoluble inorganic copper compounds, is then coupled with a diazo solution obtained in the usual manner from 217 parts 5-sulfo-2-amino-benzoic acid. The formation of the azo dyestuff and its combination with the copper-ammine compound occur quite rapidly and the novel dyestuff separates as beautiful brownish leaflets, which are isolated in the usual manner. It has most probably the formula:

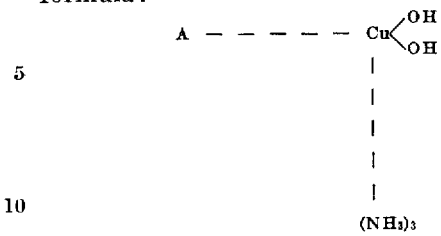

wherein A stands for the azo dyestuff of the formula:

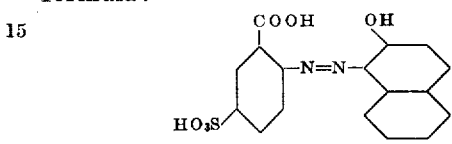

It is soluble in water with a yellowish-brown color and in concentrated sulfuric acid with a reddish-violet color. It dyes wool from an acid bath very fast yellowish-brown shades. On reduction with tin chloride and hydrochloric acid the dyestuff yields 5-sulfo-2-amino-benzoic acid, 1-amino-2-hydroxy-naphthalene, cuprous chloride and ammonium chloride.

The same dyestuff is obtained when replacing in this example the tetrammine-cupri sulfate by tetrammine-cupri-hydroxyd, as obtained by bubbling air through a suspension of finely divided copper in aqueous ammonia.

*Example 3.*—121 parts 3-amino-benzaldehyde are diazotized in the usual manner and coupled in acetic acid solution with 502 parts 5-5'-dihydroxy-2-2'-dinaphthylurea-7-7'-disulfonic acid. The coupling being complete, the reaction mass is made alkaline by the addition of 800 parts soda ash and a solution of tetrammine-cupri sulfate added, as prepared, according to example 4, from 210 parts crystallized copper sulfate; the solution is cooled and at about 5° C. coupled with a solution of the diazo compound prepared in the usual manner from 137 parts 2-amino-benzoic acid. The complex cupri-ammine-azo dyestuff forms and is isolated in the usual manner. It has most probably the formula:

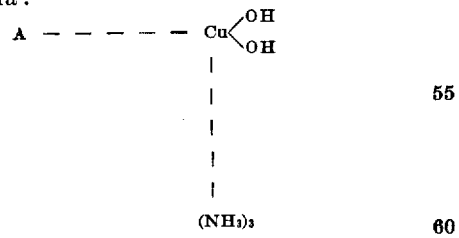

wherein A stands for the disazo dyestuff of the formula:

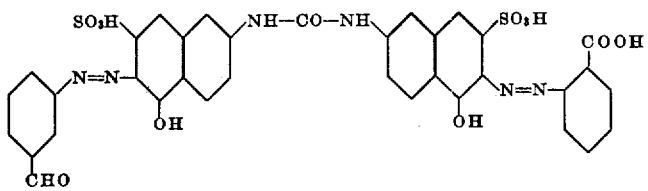

It is soluble in water with a brick-red and in concentrated sulfuric acid with a bluish-red color. It dyes cotton very fast brick-red shades. Reduction with tin chloride and hydrochloric acid produces 3-amino-benzaldehyde, 2-aminobenzoic acid, 6-6'-diamino-5-5'-dihydroxy-2-2'-dinaphthylurea-7-7'-disulfonic acid, cuprous chloride and ammonium chloride.

A very similar cupri-ammine-azo dyestuff is obtained by substituting in this example the tetrammine-cupri sulfate by hexammine-cupri chloride:

*Example 4.*—The diazo compound obtained from 137 parts 2-amino-benzoic acid is added at 0° C. to an aqueous solution of 224 parts 2-naphthol-6-sulfonic acid containing 700 parts soda ash and tetrammine-supri sulfate as obtained from 350 parts crystallized copper sulfate and 700 parts 20% aqueous ammonia. The coupling and combination with the cupri-ammine proceed quite rapidly. The clear solution of the dyestuff which contains no trace of water insoluble inorganic copper compounds is salted out, the precipitated dyestuff is filtered off, washed out and dried. It produces on wool a brownish-orange of very good fastness to light, alkali and washing. The tetrammine-cupri sulfate used in this example can be replaced by a solution of tetrammine-cupri hydroxyd as obtained by bubbling air through a suspension of finely divided metallic copper is aqueous ammonia. Substantially the same dyestuff is obtained.

*Example 5.*—107 parts 2-toluidine are diazotized and coupled in weakly congo-acid or acetic acid solution with 504 parts 5-5'-dihydroxy-2-2'-dinaphthylurea-7-7'-disulfonic acid; the coupling proceeds and a solution of the mono-azo dyestuff is obtained. This is made alkaline with 1000 parts soda ash, and an aqueous solution of 472 parts hexammine-cuprichloride [Cu(NH₃)₆]Cl₂ added; the diazo compound obtained from 137 parts o-amino-benzoic acid is run into the so obtained clear solution. After completion of the coupling the dyestuff is salted out, filtered off, washed out and dried. The so obtained complex cupri-ammine-azo dyestuff dyes cotton brick-red shades of excellent fastness to light, alkali and acid.

*Example 6.*—The tetrazo compound obtained from 350 parts 4-4'-diamino-diphenyl-urea-3-3'-dicarboxylic acid is coupled in acetic acid solution with 315 parts 2-phenyl-amino-5-naphthol-7-sulfonic acid. The solution is made distinctly alkaline, after the coupling is complete, then an already prepared solution of tetrammine-cupri sulfate solution, from 700 parts crystallized copper sulfate and about 1340 parts 20% aqueous ammonia, and finally a concentrated aqueous solution of 2-acetyl-amino-5-hydroxynaphthalene-7-sulfonic acid, are added. The reaction mass is stirred for some time, the temperature being increased at the end to about 30-40° C.; the dyestuff is then isolated in the usual manner. The so obtained complex cupri-ammine-azo dyestuff dyes cotton clear, violet shades of very good fastness to light, alkali and acid. The 2-acetyl-amino-5-naphthol-7-sulfonic acid used in this example can be replaced by the isomer 2-acetyl-amino-8-naphthol-6-sulfonic acid or the 1-acetyl-, respectively 1-benzoyl-amino-8-naphthol-3-6-disulfonic acid, complex cupri-ammine-azo dyestuffs having similar properties and dyeing similar shades are so obtained.

We claim:—

1. In a process of producing a complex cupri-ammine-azo dyestuff the step comprising coupling diazotized ortho-amino-benzoic acid with the mono-azo dyestuff obtained from diazotized 3-amino-benzaldehyde and 5-5'-dihydroxy-2-2'-dinaphthylurea-7-7'-disulfonic acid and simultaneously reacting thereon with tetrammine-cupri sulfate in the presence of sodium carbonate.

2. As a new product the complex cupri-ammine-azo dyestuff of the probable formula:

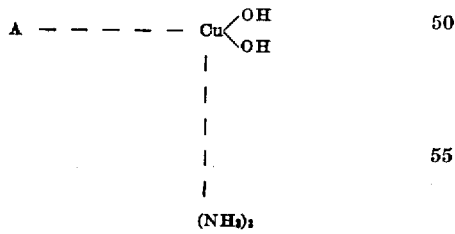

wherein A stands for the disazo dyestuff of the formula:

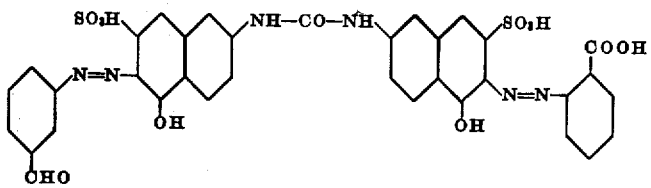

which is soluble in water with a brick-red color and in concentrated sulfuric acid with a bluish-red color and dyes cotton very fast brick-red shades.

3. As new products the complex compounds of the general formula:

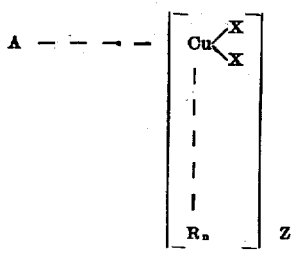

wherein A represents an azo dyestuff molecule containing in ortho-position to the azo group a substituent of the group including the hydroxyl-, the carboxyl-, and the carbonyl groups, X represents hydroxyl or an acidic radicle, R represents molecules of the ammonia type or of the aquo ($H_2O$) type, but at least one R being a molecule of the ammonia type, n represents the number 3 or 5, and Z represents the number 1 or 2.

4. As new products the complex compounds of the general formula:

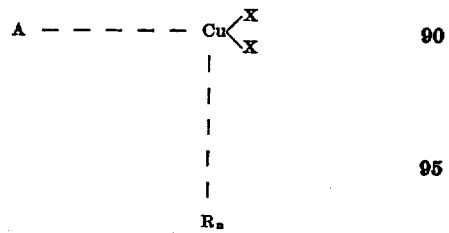

wherein A represents an azo dyestuff molecule containing in ortho-position to the azo group a substituent of the group including the hydroxyl-, the carboxyl-, and the carbonyl groups, X represents hydroxyl or an acidic radicle, R represents molecules of the ammonia type or of the aquo ($H_2O$) type, but at least one R being a molecule of the ammonia type, and n represents the number 3 or 5.

5. As new products the complex compounds of the general formula:

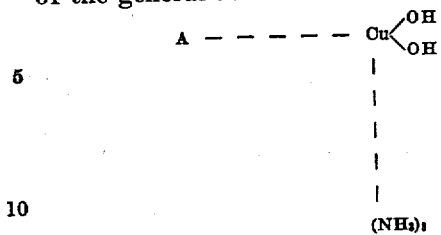

wherein A represents an azo dyestuff molecule containing in ortho-position to the azo group a substituent of the group including the hydroxyl-, the carboxyl-, and the carbonyl groups.

6. The process which comprises coupling a diazo compound substituted in ortho-position to the diazo group by a substituent of the group including the hydroxyl-, the carboxyl-, and the carbonyl group with any coupling compound in the presence of a complex cupriammine compound and in the presence of a weakly alkaline agent.

In testimony whereof, we affix our signatures.

WINFRIED HENTRICH.
MAX HARDTMANN.

CERTIFICATE OF CORRECTION.

Patent No. 1,690,782.   Granted November 6, 1928, to

WINFRIED HENTRICH ET AL.

It is hereby certified that error appears in the printed specification of the above numbered patent requiring correction as follows: Page 1, line 62, for the word "ethyl-enediamine" read "ethylenediamine"; page 3, line 83, for "supri" read "cupri"; and that the said Letters Patent should be read with these corrections therein that the same may conform to the record of the case in the Patent Office.

Signed and sealed this 8th day of January, A. D. 1929.

M. J. Moore,
Acting Commissioner of Patents.

(Seal)

5. As new products the complex compounds of the general formula:

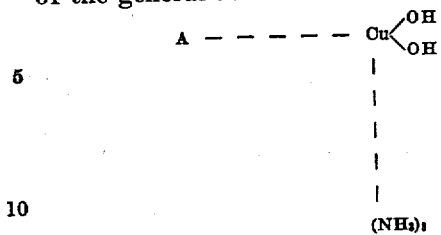

wherein A represents an azo dyestuff molecule containing in ortho-position to the azo group a substituent of the group including the hydroxyl-, the carboxyl-, and the carbonyl groups.

6. The process which comprises coupling a diazo compound substituted in ortho-position to the diazo group by a substituent of the group including the hydroxyl-, the carboxyl-, and the carbonyl group with any coupling compound in the presence of a complex cupriammine compound and in the presence of a weakly alkaline agent.

In testimony whereof, we affix our signatures.

WINFRIED HENTRICH.
MAX HARDTMANN.

CERTIFICATE OF CORRECTION.

Patent No. 1,690,782.   Granted November 6, 1928, to

WINFRIED HENTRICH ET AL.

It is hereby certified that error appears in the printed specification of the above numbered patent requiring correction as follows: Page 1, line 62, for the word "ethyl-enediamine" read "ethylenediamine"; page 3, line 83, for "supri" read "cupri"; and that the said Letters Patent should be read with these corrections therein that the same may conform to the record of the case in the Patent Office.

Signed and sealed this 8th day of January, A. D. 1929.

(Seal)

M. J. Moore,
Acting Commissioner of Patents.